United States Patent
Humphries (10) Patent No.: US 12,482,124 B2
(45) Date of Patent: Nov. 25, 2025

(54) SYSTEMS AND METHODS OF VOLUMETRICALLY ASSESSING STRUCTURES OF SKELETAL CAVITIES

(71) Applicant: National Jewish Health, Denver, CO (US)

(72) Inventor: Stephen M. Humphries, Denver, CO (US)

(73) Assignee: National Jewish Health, Denver, CO (US)

( * ) Notice: Subject to any disclaimer, the term of this patent is extended or adjusted under 35 U.S.C. 154(b) by 633 days.

(21) Appl. No.: 17/347,105

(22) Filed: Jun. 14, 2021

(65) Prior Publication Data
US 2022/0398763 A1 Dec. 15, 2022

(51) Int. Cl.
| | | |
|---|---|---|
| G06T 7/62 | (2017.01) | |
| A61B 6/03 | (2006.01) | |
| A61B 6/50 | (2024.01) | |
| G06T 7/10 | (2017.01) | |

(52) U.S. Cl.
CPC .......... *G06T 7/62* (2017.01); *A61B 6/032* (2013.01); *A61B 6/501* (2013.01); *A61B 6/505* (2013.01); *G06T 7/10* (2017.01); *G06T 2207/10081* (2013.01); *G06T 2207/20084* (2013.01); *G06T 2207/30008* (2013.01)

(58) Field of Classification Search
None
See application file for complete search history.

(56) References Cited

U.S. PATENT DOCUMENTS

| | | | | |
|---|---|---|---|---|
| 2006/0251577 | A1* | 11/2006 | Giuliano ............ | A61K 49/0438 424/1.11 |
| 2007/0127804 | A1* | 6/2007 | Yoshida ................. | G06T 7/136 382/131 |
| 2011/0176999 | A1* | 7/2011 | Quagliano ........... | A61K 9/0095 424/9.1 |
| 2011/0282194 | A1* | 11/2011 | Reiner .................. | G16H 50/70 600/431 |
| 2021/0295504 | A1* | 9/2021 | Amundson ......... | G06F 18/2413 |

OTHER PUBLICATIONS

Giacomini G, Pavan ALM, Altemani JMC, Duarte SB, Fortaleza CMCB, Miranda JRA, de Pina DR. Computed tomography-based volumetric tool for standardized measurement of the maxillary sinus. PLoS One. Jan. 5, 2018;13(1):e0190770. doi: 10.1371/journal. pone.0190770. PMID: 29304130; PMCID: PMC5755892.*

(Continued)

*Primary Examiner* — Jiangeng Sun
(74) *Attorney, Agent, or Firm* — Sheridan Ross P.C.

(57) ABSTRACT

Systems and methods of detecting a presence of opacification or pneumatization in skeletal structures of patients are disclosed. The systems and methods include receiving images, processing the images using a convolutional neural network, and generating, with the convolutional neural network, an opacification score for the image. Systems and methods include training the convolutional neural network to delineate skeletal structure pixels within a computed tomography scan image and to generate an intensity value for each skeletal structure pixel within a computed tomography scan image to determine an opacification score for the computed tomography scan image.

18 Claims, 7 Drawing Sheets

(56) References Cited

OTHER PUBLICATIONS

Chowdury et al. "Automated Classification of Osteomeatal Complex Inflammation on CT Using Convolutional Neural Networks," International Forum of Allergy & Rhinology, Jaun. 2019, vol. 9, No. 1, pp. 46-52.

Deconde et al. "SNOT-22 quality of life domains differentially predict treatment modality selection in chronic rhinosinusitis," International Forum of Allergy & Rhinology, Dec. 2014, vol. 4, No. 12, pp. 972-979.

Hopkins et al. "Psychometric validity of the 22-item Sinonasal Outcome Test," Clinical Otolaryngology, 2009, vol. 34, pp. 447-454.

Kang et al. "Sinonasal alterations in computed tomography scans in cystic fibrosis: a literature review of observational studies," International Forum of Allergy & Rhinology, Mar. 2014, vol. 4, No. 3, pp. 223-231.

Kariya et al. "Lund-Mackay Computed Tomography Score Is Associated With Obstructive Pulmonary Function Changes in Chronic Cough Patients," American Journal of Rhinology & Allergy, 2019, vol. 33, No. 3, pp. 294-301.

Keating et al. "Classic Respiratory Disease but Atypical Diagnostic Testing Distinguishes Adult Presentation of Cystic Fibrosis," Chest, May 2010, vol. 137, No. 5, pp. 1157-1163.

Lim et al. "3D Analysis for Staging Chronic Rhinosinusitis," International Forum of Allergy & Rhinology, Nov. 2017, vol. 7, No. 11, pp. 1052-1057.

Marino et al. "Paranasal sinus opacification-to-pneumatization ratio applied as a rapid and validated clinician assessment," International Forum of Allergy & Rhinology, Jan. 2017, vol. 7, No. 1, pp. 24-29.

Oliver et al. "Correlation of Exhaled Nasal Nitric Oxide With Sinus Computed Tomography and Sinonasal Outcome Test Scores: A Cross-sectional Pilot Study," American Journal of Rhinology & Allergy, 2018, vol. 32, No. 6, pp. 533-538.

Rudmik et al. "Patient-reported outcome measures for adult chronic rhinosinusitis: A systematic review and quality assessment," Journal of Allergy and Clinical Immunology, Dec. 2015, vol. 136, No. 6, pp. 1532-1540.e2.

Vivanti et al. "Patient-specific and global convolutional neural networks for robust automatic liver tumor delineation in follow-up CT studies," Medical & Biological Engineering & Computing, 2018, vol. 56, No. 9, pp. 1699-1713.

Zucker et al. "Deep learning to automate Brasfield chest radiographic scoring for cystic fibrosis," Journal of Cystic Fibrosis, 2020, vol. 19, pp. 131-138.

\* cited by examiner

SYSTEMS AND METHODS OF VOLUMETRICALLY ASSESSING STRUCTURES OF SKELETAL CAVITIES

BACKGROUND

Paranasal sinuses are a group of spaces or cavities in the skull that are normally filled with air. The presence of inflamed tissue, fluid and/or other non-air in the paranasal sinuses is a symptom of a range of issues, such as viral, bacterial, or fungal infections or allergic reactions. Assessment of the size, shape and contents of the paranasal sinuses is a key step in accurate diagnosis, treatment prescription and/or surgical planning. The ability to quickly and accurately assess the presence and extent of abnormality in a patient's paranasal sinuses is often a key step in treating the patient.

Sinus cavity inflammation can be manually measured through the use of computed, or computerized, tomography ("CT") scans as well as other imaging technologies. CT plays a key role in the evaluation of the paranasal sinuses. Using CT scans, trained analysts are typically capable of visually scoring the extent of non-air, or opacification, within a cavity. For example, a sinus cavity filled with air may be visually distinct from a sinus cavity filled or partially-filled with a substance other than air. Trained analysts may be capable of visually identifying portions of a CT scan which should be clear in a healthy patient but which are instead opacified.

Computerized volumetric analysis of paranasal sinus cavities has benefits over visual scoring, but typically relies on manual image segmentation, which is difficult and time-consuming, limiting practical applicability.

There is a recognized unmet need for precise, objective evaluation of disease severity, and treatment response in chronic rhinosinusitis ("CRS"). CT is a modality for non-invasive imaging of paranasal sinuses and plays a key role in evaluating CRS. Mucosal thickening visible on CT as opacification is considered an objective diagnostic criterion for CRS. Current guidelines recommend CT to improve diagnostic accuracy and to measure the extent of disease. Contemporary computer approaches for the quantification of sinus cavity contents on CT scans have shown promise, but such methods rely on manual or semiautomatic segmentation of the paranasal sinus cavities, which is time-consuming, subjective and impractical for routine clinical use. Truly objective quantification of sinus opacification has been elusive.

The Lund-Mackay ("LM") system provides a simple technique for semiquantitative visual scoring of sinus CT that correlates with clinical measures of disease severity but does not consistently correlate with symptoms. Visual scoring is also time-consuming, subjective, and lacks sensitivity to change. For this reason, improved standardized objective assessment is needed.

DESCRIPTION

As described above, contemporary computer approaches for the quantification of sinus cavity contents on CT scans have shown promise, but such methods rely on manual or semiautomatic segmentation of the paranasal sinus cavities, which is time consuming and impractical for routine clinical use. Methods and systems of fully automatically segmenting and scoring the opacification of paranasal sinus cavities as described herein enable doctors to quickly and accurately determine the severity of a patient's condition to treat the patient in a timely manner. Using methods and systems as described herein, researchers may be enabled to survey a large group of participants, and precisely quantify changes on sequential scans of individuals, enrolled in research studies and/or treatment trials. As opposed to using teams of human analysts to score images of test patient sinus cavities whose visual scoring abilities may vary resulting in widely inaccurate scores, using an automatic system as described herein, researchers may be enabled to quickly obtain accurate scores for any number of test patients. Each score created using such an automatic system may be created in a same manner such that no human error is introduced, resulting in scores which are more useful in scientific studies. This approach may also be used for standardized assessments or presurgical evaluation of patients under care for sinus symptoms.

CRS frequently accompanies lower airway disease and its recognition and management is of particular importance in severe or refractory pulmonary diseases such as asthma and cystic fibrosis. The co-occurrence of upper and lower airway diseases supports the concept of a unified airway model and suggests a link between the presence and extent of sinonasal inflammation and lower airway disease. Efficient quantitative sinus CT analysis may be valuable for research on CRS and the unified airway model as well as for therapeutic trials and, eventually, clinical practice.

A number of visual scoring systems for evaluation of sinus CT have been proposed, but the LM system remains the most widely accepted. It has the benefit of simplicity and has shown a correlation with a wide range of relevant clinical parameters. However, of much interest, semiquantitative visual scoring of sinus CT does not tend to correlate with sinus specific symptom severity.

Low improvement and post treatment change in LM scores has also been reported. This lack of correlation may be due to limitations of visual scoring, such as subjectivity or coarse scales, or may be due to variations in the perception and reporting of symptom severity and underscores the need for precise metrics of CRS.

A fully automated system for sinus segmentation of a CT scan could facilitate efficient, precise and truly objective quantification of sinonasal inflammation, which may have clinical utility as a screening tool or could enable identification of new phenotypes or markers of severity in upper and lower airway diseases. Objective quantitative assessments of sequential scans using a full automated system may also improve precision and sensitivity in evaluating subtle changes over time.

Recently, convolutional neural networks ("CNNs"), one of the primary data processing models used in deep learning, have emerged as powerful tools for automatic medical image analysis. Researchers have shown impressive results using CNNs for difficult tasks such as diagnosis, disease staging, quantification, and anatomic segmentation.

As described herein, a CNN algorithm may be trained to perform automated volumetric segmentation of paranasal sinuses on a CT scan, enabling automatic, efficient, and objective volumetric quantification of sinus cavity contents. Such a system may be developed and validated by comparing CNN assessment of sinus opacification on CT with manual segmentation and LM visual scores. A CNN trained as described herein may be used to perform fully automatic quantitation of paranasal sinus opacification in the diagnostic workup of patients with chronic upper and lower airway disease. Furthermore, using such a system, it may be determined whether other clinical disease markers, including pulmonary function tests and blood biomarkers, correlate with volumetric CT scores.

As described herein, LM and opacification scores generated by a CNN can show similar, modest correlation with clinical metrics. Contemporary methods of analyzing sinus cavity opacification rely on manual or semiautomatic segmentation of the sinus cavities, which can take anywhere from twenty minutes to several hours to accomplish. For this reason, there is a substantial bottleneck for research which makes volumetric analysis infeasible in clinical practice. An automated system as described herein enables volumetric CT analysis to become the gold standard of measurement of disease extent and response to treatment in CRS. Using systems and methods as described herein, sinus opacification can be calculated fully automatically and large sets of clinical CTs can be examined in an efficient manner.

As described herein, fully automatic, volumetric quantification of sinus opacification on CT using a CNN is feasible and produces a clinically meaningful index of severity. Incorporation of this objective analysis into sinus CT assessments can provide helpful additional information for researchers and clinicians. All description herein concerning sinus cavities and methods for detecting the presence of opacification in sinus cavities applies generally to other skeletal structures as disclosed herein, including structures in bones, whole bones, and joint spaces and methods of characterizing the contents of such skeletal structures. Such other skeletal structures will have a normal state (non-diseased, non-inflamed, non-infected, not filled with fluid, etc.) that will be reflected by a degree of opacification ranging from completely pneumatized (as in the case of a clear sinus cavity filled with air) to completely opacified (as in the case of dense bone material). The degree of abnormality in a given skeletal structure is determined by variation from its normal degree of opacification. An abnormality can be either more pneumatized or more opacified than a normal skeletal structure depending on the degree of opacification of the normal structure. As one example, a skeletal structure having some degree of bone resorption will be less opacified than the skeletal structure in its normal state. Alternatively, an inflamed sinus structure will be more opacified than one in its normal state. The present invention includes characterizing the contents of a skeletal structure based on its degree of opacification. For example, a soft tissue-filled structure will appear more opacified than a non-viscous fluid-filled structure which will be more opacified than an air-filled completely pneumatized structure, and thus, the present invention encompasses characterizing or determining the contents of a skeletal structure based on the degree of opacification and the difference between that degree and a normal degree for the skeletal structure in question. It will be appreciated that CT image pixel brightness is proportional to physical density, and therefore, normal sinuses look black on images, but have increasing pixel brightness or opacity when there is an abnormality.

Visual Assessment

To create a CNN capable of estimating opacification of a sinus cavity based on a CT scan, training data is required. In accordance with one or more of the embodiments described herein, CT scans to be used in a test cohort to train a CNN may be scored visually. The visual scores for each CT scan in the test cohort may be used for feedback to train the CNN.

To create the visual score for each CT to be used in the training, imaging analysts, trained on the LM system, may perform LM scoring of CT scans in the test cohort. Using the LM system, a score of 0, 1, or 2 may be assigned to sinus cavities that are without opacification, partially opacified, or completely opacified, respectively. Separate scores may be generated by the analysts for each of the left and right maxillary sinuses, left and right frontal sinuses, left and right sphenoid sinuses, left and right anterior ethmoid sinuses, left and right posterior ethmoid sinuses, left and right zones of the ostiomeatal complex ("OMC"). In some embodiments, scores for the OMC may be limited to 0 or 2. A total sinus opacification score for each patient may be calculated as a sum of scores for each sinus zone with a possible maximum of 24 points.

In some embodiments, cases where total scores for each of the analysts differed by a threshold number of points, e.g., more than one point, may be independently scored by a radiologist. The average of all total visual scores was used as the final LM score for each patient.

Delineation Training of CNNs

Analysts may be used to manually create a sinus segmentation mask for a CT scan to be used in training a CNN. For example, an analyst may visually review a CT scan and delineate the portions of the CT scan associate with each sinus zone within the CT scan. Through the delineation of a CT scan, a sinus segmentation mask may be manually created.

A plurality of manually created sinus segmentation mask may be used to train a CNN to automatically create sinus segmentation masks for CT scans of other sinus cavities. For example, a CNN may be trained to receive a CT scan as an input and output a CT scan in which each sinus zone has been delineated. In some embodiments, a CNN may output, for example, a text file listing coordinates of each pixel associated with each zone. In some embodiments, a CNN may output, for example, a copy of the input CT scan with pixels associated with each zone marked visually.

It should be appreciated that a CNN may also or alternatively be trained to create segmentation masks for types of skeletal structures other than sinus cavities, including cavities in bones, whole bones, joint spaces, etc. For example, cavities within any type of bone or bone structure, such as a skull, may be segmented using a CNN as described herein in order to characterize the contents of the cavities.

Opacification Detection Training of CNNs

Sinus CT scans may be collected from a number of patients having underwent imaging as part of multidisciplinary clinical workup. A CNN may be trained to perform automatic segmentation using a subset of CT scans (e.g., 180 scans) which have been segmented manually. A set of scans (e.g., 510 scans) which are non-overlapping with the subset of scans used for the training may be used to test the CNN. Opacification scores generated by the CNN may be compared with Lund-MacKay ("LM") visual scores, pulmonary function test results, and other clinical variables using Spearman correlation and linear regression.

CNN scores correlated with LM scores (rho=0.82, p<0.001) and with forced expiratory volume in 1 second ($FEV_1$) percent predicted (rho=−0.21, p<0.001), $FEV_s$/forced vital capacity ratio (rho=−0.27, p<0.001), immunoglobulin E (rho=0.20, p<0.001), eosinophil count (rho=0.28, p<0.001), and exhaled nitric oxide (rho=0.40, p<0.001).

To test the accuracy of a CNN trained in accordance with one or more of the embodiments described herein, a retrospective analysis of patients having undergone paranasal sinus CT imagery as part of a clinical workup at a hospital may be performed. CT scans used in the analysis may be acquired using equipment such as a Siemens' CT device and without intravenous contrast. Volumetric studies consisting of axial images with, for example, 1 mm slice thickness and 1 mm spacing, and reconstructed with a high spatial frequency algorithm may be used. In some embodiments, CT exams may be deidentified before the analysis. A first set of CT scans may be used for CNN development, including a first subset of CT scans for training the CNN and a second subset of CT scans for validating the CNN.

Each scan used in the training and validation of the CNN may be associated with a data set identifying a number of factors relating to the source of the scan. For example, each scan may be associated with a source patient. Information relating to the source patient may be used, such as clinical data, including forced expiratory volume in 1 second ($FEV_1$) percent predicted, $FEV_1$/forced vital capacity (FVC) ratio, exhaled nitrous oxide (FeNO), immunoglobulin E (IgE), and absolute eosinophil levels on complete blood count within 90 days of a particular CT scan. Demographic data, including age at time of CT scan, sex, and patient-reported smoking history (never, former, or current smoker) may also be included in the data set.

Patients with an International Classification of Disease, tenth revision (ICD-10) code matching J32.x in their record may be classified as having a diagnosis of CRS. Patients with a diagnosis of asthma may be identified by an ICD-10 code of J45.x and confirmed using an adaptation of the 2014 Global Initiative for Asthma guidelines. Confirmation criteria such as previous methacholine challenge performed demonstrating a change in the PC20 (the provocative concentration of methacholine that results in a 20% drop in $FEV_1$) of less than or equal to eight milligrams, methacholine challenges with a change in specific airway conductance (sGaw) PC40 less than or equal to eight milligrams, an $FEV_1$ percent change after bronchodilation of greater than or equal to twelve percent, and/or an sGaw percent change-post of greater than or equal to forty percent may be used to verify an opacification level estimated by a trained CNN. Texts of radiologist CT reports may also be used to identify subjects with previous sinus surgery by searching key terms, for example, "post-surgical" and "surgery."

To analyze skeletal cavities other than sinus cavities, it should be appreciated CNNs may be trained to detect bone structure features in addition to or instead of opacification. Using the same or similar systems and methods, cavities in bones, such as whole bones, joint spaces, etc., may be surveyed and assessed.

Deep Learning Algorithm and Calculation of Opacification

CTs on a subset of patients selected for algorithm development may be manually segmented using software such as ITK-Snap™. Experienced imaging analysts may manually outline boundaries of maxillary, frontal, ethmoid, and sphenoid sinus for each CT to create three-dimensional binary images of the combined paranasal sinus cavities.

A CNN algorithm may be implemented using a programming language such as Python and may be based on an architecture such as Tiramisu. The CNN may be executed using a computer system. The computer system may be used for CNN algorithm development, training, and testing.

The CNN may be trained using a set of manually segmented CTs to produce a single volumetric segmentation of combined sinus cavities, given a sinus CT as input. Due to the time and effort required for manual segmentation, there may be a practical limit on the number of cases available for training and validation of the CNN. For this reason, in some embodiments an 80%-20% distribution of manually segmented scans may be used for training and validation, respectively.

A CNN as described herein may be trained over a number of epochs. For example, in some embodiments, ten epochs may be used. Such training may, depending on the number of CT scans used for training, take a number of days.

After training of the CNN is complete, the algorithm used by the CNN may be locked for verification.

The CNN may be trained to generate an estimate of a total sinus opacification. Sinus opacification may be measured by the CNN by detecting an intensity value in Hounsfield units ("HU") for each pixel within an input CT scan. The nominal pixel intensity value for air in a CT scan is around −1000 HU, the nominal pixel intensity value for water in a CT scan is around 0 HU, and the nominal pixel intensity value for bone in a CT scan is around 200 HU. A cut-off value of −500 HU can be used to separate air from soft tissue while excluding bone. As such, pixels with an intensity value of between −500 and +200 HU may be determined by the CNN to be effectively opacified.

In this way, the CNN may be configured to determine which pixels within a CT scan are associated with a sinus cavity, and which pixels within the sinus cavity of the CT scan are associated with opacification. The total sinus opacification of a given patient may be assigned a total sinus opacification score. Generating an estimate of the total sinus opacification may comprise generating the total sinus opacification score by calculating a percentage of segmentation volume occupied by CT pixels with an intensity value of between −500 and +200 HU. In addition to opacification score, in some embodiments, a CNN may be further configured to compute and output a total volume of sinus cavity segmentation in cubic centimeters.

As described above, to analyze skeletal cavities other than sinus cavities, it should be appreciated CNNs may be trained to detect bone structure features in addition to or instead of opacification. Using the same or similar systems and methods, cavities in bones, such as whole bones, joint spaces, etc., may be surveyed and assessed.

Statistical Analysis

The accuracy of a trained CNN to create a sinus segmentation mask may be verified in a number of ways. For example, a plurality of CT scans may be reserved for technical validation purposes. Each CT scan reserved for validation may be segmented manually by one or more analysts and automatically by a trained CNN. Each manually created sinus segmentation mask and automatically-created sinus segmentation mask for the CT scans reserved for technical validation may be compared, for example by using the Dice coefficient and by comparing distances between segmentation surfaces in three dimensions. The Dice coefficient is a measure of overlap used for evaluating segmentation accuracy (calculated as two times the area of overlap between segmentations divided by sum of the two segmentation areas, which produces a value on the interval of zero to one).

Each CT scan reserved for technical validation may also be given opacification scores manually and automatically as discussed above. Opacification scores based on manual and automatic segmentations may be compared, for example, by using Bland-Altman analysis.

Descriptive statistics on the study population may also be reviewed. Total LM scores by each analyst reviewing a CT scan reserved for technical validation may be compared, for example, by using intraclass correlation coefficient (ICC). Automatically created volumetric opacification scores and average total LM scores for manually reviewed CT scans may be compared, for example, by using Spearman rank correlation. A Spearman rank correlation is a nonparametric version of a Pearson product-moment correlation. Spearman correlation coefficient, (p) measures the strength and direction of association between two ranked variables. In some embodiments, the Kruskal-Wallis test may be used to compare mean opacification scores across subgroups determined by stratifying the test population into bins according to average total LM score and performed p-value-adjusted pairwise comparisons using the Tukey test.

Univariate associations between average total LM scores, measurements facilitated by the CNN segmentation (percent opacification and total sinus volume), and clinical parameters may be analyzed using the Spearman rank correlation without adjustment for multiple comparisons. Multivariable linear regression may be used to test relationships between CT-derived variables and clinical parameters with adjustment for factors such as age, sex, smoking history, and asthma diagnosis. The Mann-Whitney U test and analysis of variance may be performed to test for differences in CNN opacification scores in groups defined by factors such as diagnosis, lung function, and/or smoking history. Statistical calculations may also be performed, for example, by using R version 3.6.0 (R Foundation for Statistical Computing, Vienna, Austria), wherein p<0.05 may be considered statistically significant.

Study Population

To test the efficiency and accuracy of a trained CNN in accordance with embodiments described herein, a testing cohort of CT scans may be used. Each CT scan in a testing cohort may be associated with a particular patient. Each patient may be evaluated for a number of factors, such as sex, smoking history, history of sinus surgery, whether the patient has been diagnosed with chronic rhinosinusitis (CRS) and/or asthma, predicted forced expiratory volume in one second ($FEV_1$), and other factors. In some embodiments, such factors may be obtained in a timely manner, such as within ninety days of the CT scan.

As illustrated in Table 1 below, patients associated with CT scans in a testing cohort may be summarized in a table. The exemplary testing cohort illustrated in Table 1 includes 510 study participants (n=510). The data in the table is expressed as a number with a percentage of total in parentheses and continuous variables expressed as mean±standard deviation. Differences according to CRS diagnosis by chi-square test for categorical variables and by F test with analysis of variance for continuous variables.

TABLE 1

| Testing Cohort Data | | | | |
|---|---|---|---|---|
| | All (n = 510) | No CRS (n = 218) | CRS (n = 292) | p value |
| Men | 176 (34.5%) | 63 (28.9%) | 113 (38.7%) | |
| Women | 334 (65.5%) | 155 (71.1%) | 179 (61.3%) | |
| Age (years) | 57.2 ± 15.0 | 59.5 ± 14.7 | 55.5 ± 14.9 | 0.003 |
| No history of smoking | 336 (65.9%) | 143 (65.6%) | 193 (66.1%) | 0.94 |
| Former smoker | 166 (32.5%) | 72 (33.0%) | 94 (32.2%) | |
| Current smoker | 8 (1.6%) | 3 (1.4%) | 5 (1.7%) | |
| History of sinus surgery | 180 (35.3%) | 47 (26.1%) | 133 (73.9%) | <0.001 |
| CRS | 292 (57.3%) | 0 (0.0%) | 292 (100.0%) | |
| Asthma | 232 (45.5%) | 90 (38.8%) | 142 (61.2%) | 0.12 |
| $FEV_1$ percent predicted | 76.5 ± 23.7 | 77.8 ± 24.3 | 75.5 ± 23.2 | 0.29 |
| $FEV_1/FVC$ percent predicted | 92.6 ± 15.4 | 93.7 ± 15.8 | 91.8 ± 15.1 | 0.18 |
| Exhaled nitric oxide parts per billion (ppb) | 32.5 ± 15.4 | 27.9 ± 36.4 | 35.9 ± 43.4 | 0.02 |
| Absolute eosinophil count (kU/μL) | 0.34 ± 0.88 | 0.34 ± 1.21 | 0.34 ± 0.50 | 0.97 |
| Immunoglobulin E (k/L) | 112.0 ± 237.6 | 115.9 ± 337.5 | 109.1 ± 117.4 | 0.78 |
| Total Lund-Mackay score | 4.0 ± 5.1 | 2.1 ± 3.2 | 5.4 ± 5.8 | <0.001 |
| CT sinus opacification (%) | 26.6 ± 21.7 | 18.4 ± 12.4 | 32.7 ± 24.9 | <0.001 |
| Sinus cavity volume ($cm^3$) | 62.8 ± 19.3 | 64.9 ± 18.5 | 61.3 ± 19.8 | 0.03 |
| Sinus cavity volume - men ($cm^3$) | 73.3 ± 21.7 | 77.1 ± 19.8 | 71.2 ± 22.4 | 0.08 |
| Sinus cavity volume - women ($cm^3$) | 57.3 ± 15.4 | 60.0 ± 15.4 | 55.0 ± 15.0 | 0.003 |

Figure 1A:
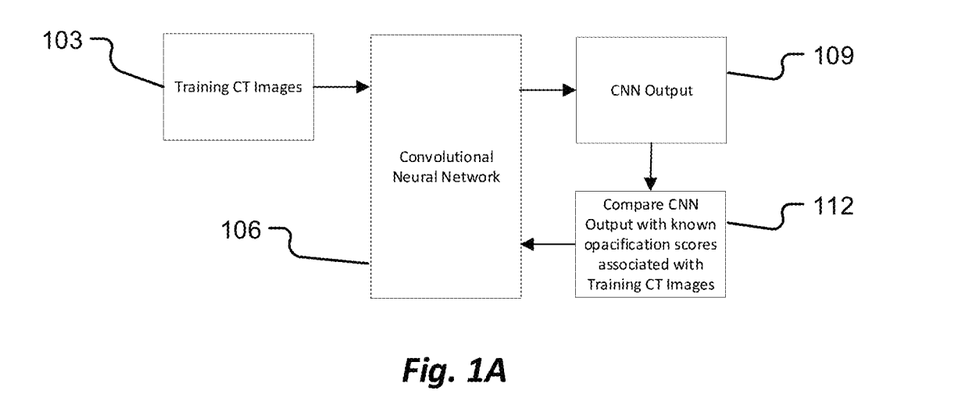
FIGS. 1A-1D are block diagrams of deep learning systems in accordance with one or more of the embodiments described herein.

As illustrated in FIG. 1A, one or more training CT images 103 maybe input into a convolutional neural network CNN 106. The CNN 106 may output a CNN output 109. The CNN output 109 may be, for example, an image file with visual markings representing one or more of sinus cavity delineations and/or an opacification score. In some embodiments the CNN output 109 may be a number or set a numbers or other text data indicating one or more of an opacification score and or data representing delineation information for a given CT scan. The CNN output 109 may be used by a process 112, for example a process executed by a computer system, configured to compare the CNN output with one or more known opacification scores associated with the training CT images 103.

Figure 1B:
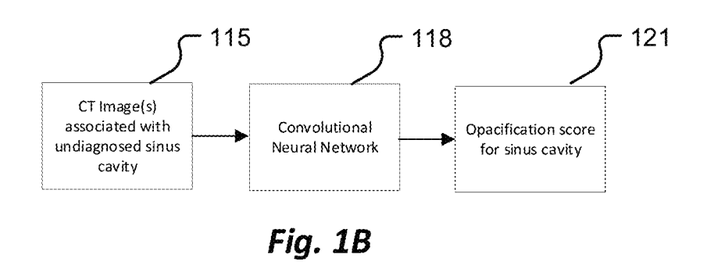

As illustrated in FIG. 1B, one or more CT images associated with one or more undiagnosed sinus cavities 115 may be input into a convolutional neural network 118 which may be configured to output an opacification score for the sinus cavity of each CT image 121. For example, The CNN 118 maybe trained to delineate an input CT image and to determine and opacification score for a sinus cavity found within the input CT image. The output of the CNN 118 maybe a number corresponding to a Lund-Mackay score or a CT sinus opacification percentage. In some embodiments, The CNN 118 output maybe volumes of sinus cavity and opacification measured in cubic centimeters.

Figure 1C:
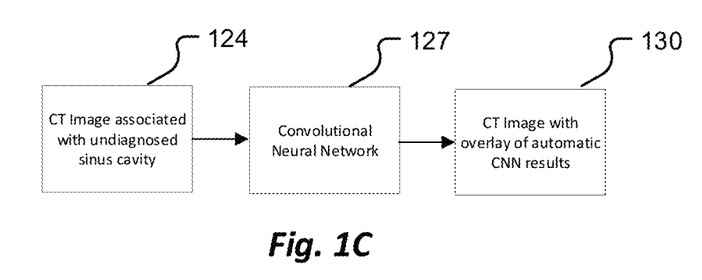

As illustrated in FIG. 1C, a CT image associated with an undiagnosed sinus cavity 124 may be input into a convolutional neural network 127 configured to output A CT image with a visual overlay of the automatic results of the CNN 130. Such a visual overlay may be as illustrated in FIG. 2B, as described below, and may be a visual indication as to which portions of the sinus cavity within the input image are associated with opacification.

Figure 1D:
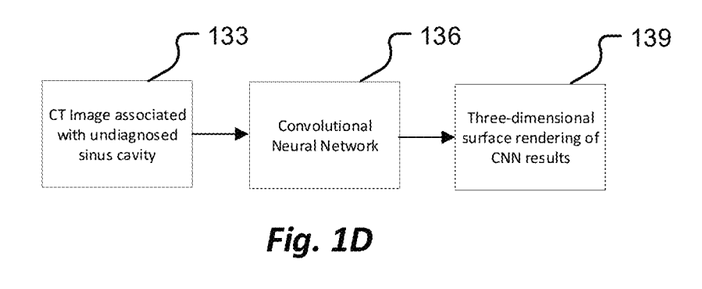

As illustrated in FIG. 1D, a CT image associated with an undiagnosed sinus cavity 133 may be input into a convolutional neural network 136 which may be configured to output a three-dimensional surface rendering of CNN results 139. Such a 3-dimensional surface rendering may B as illustrated in FIG. 2C, as described below, and may be a three-dimensional visual indication as to which portions of the sinus cavity within the input image are associated with opacification.

To validate the trained CNN, CT scans in the testing cohort were processed by the trained CNN. The CNN may be capable of automatically creating sinus segmentations for each CT scan in the test cohort in, for example, around one minute of computation time without requiring manual editing of the segmentation results. Example coronal CT images and automatic segmentation results achieved by a trained CNN are illustrated in FIGS. 2A-2F.

Figure 2A:
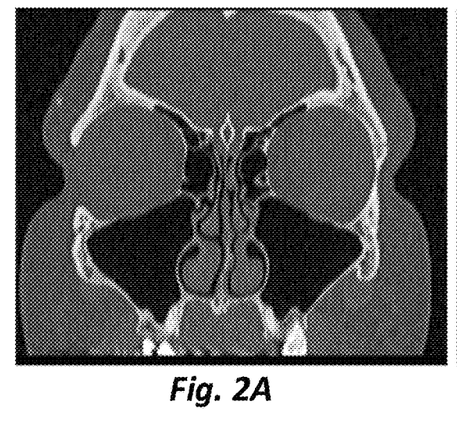
FIGS. 2A-2F are illustrations of CT scan images in accordance with one or more of the embodiments described herein.
Figure 2B:
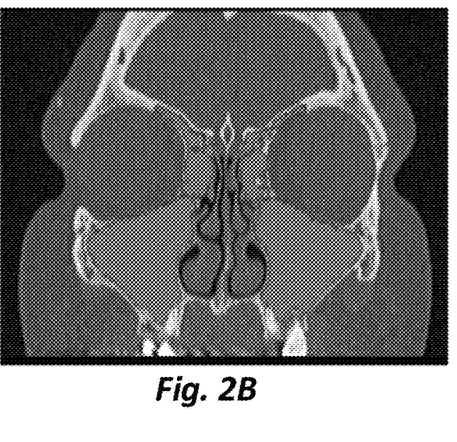
Figure 2C:
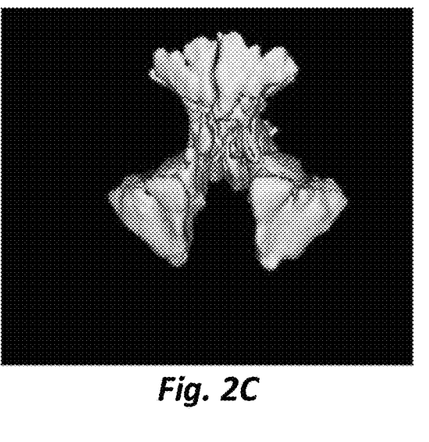

A coronal CT scan with little opacification is illustrated in FIG. 2A. The patient associated with the coronal CT scan of FIG. 2A is without sinonasal inflammation and has only nine percent opacification. When the CT scan of FIG. 2A is used as an input to a trained CNN, a modified CT scan showing automatic segmentation results as illustrated in FIG. 2B may be output. The CNN may be configured to, for example, use a CT attenuation threshold of −500 HU. As can be appreciated in FIG. 2B, portions of the coronal CT scan which were identified by the CNN as being associated with a sinus cavity may be overlayed with a visual marking as being either clear or opacified. In the example illustrated in FIGS. 2A and 2B, a majority of the sinus cavity has been determined to be clear while some opacification has been determined to exist along edges of the sinus cavity. Using the output of the CNN illustrated in FIG. 2B, a three-dimensional surface rendering of the sinus segmentation results may be generated as illustrated in FIG. 2C. The three-dimensional model may include indicators showing areas of the sinus cavity which are clear or opacified. In some embodiments, sections of the sinus cavity determined to be clear may be marked green while sections of the sinus cavity determined to be opacified may be marked red.

Figure 2D:
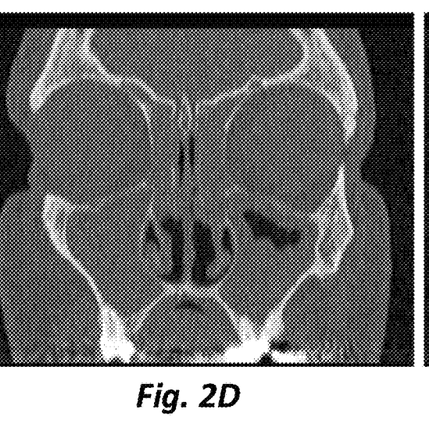
Figure 2E:
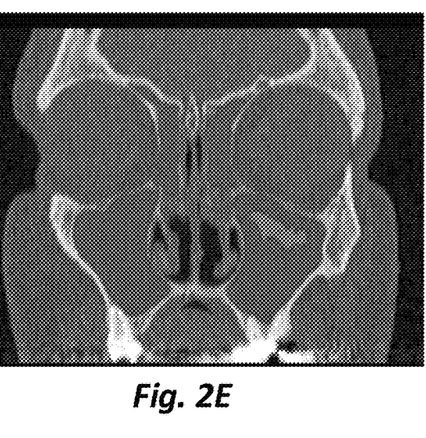
Figure 2F:
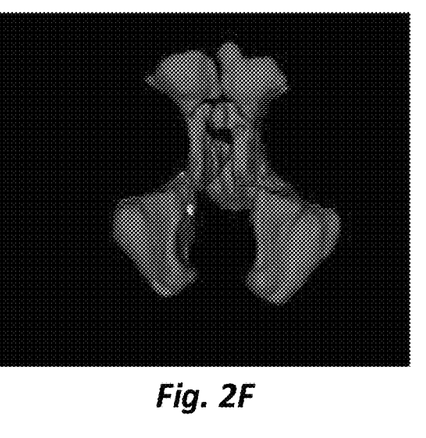

A coronal CT scan with a relatively large amount of opacification is illustrated in FIG. 2D. The CT scan illustrated in FIG. 2D may be associated with a patent with severe sinonasal inflammation, with an opacification score of ninety three percent. When the CT scan of FIG. 2D is used as an input to a trained CNN, a modified CT scan showing automatic segmentation results as illustrated in FIG. 2E may be output. As can be appreciated in FIG. 2E, portions of the coronal CT scan which were identified by the CNN as being associated with a sinus cavity may be visually marked as being either clear or opacified. In the example illustrated in FIGS. 2D and 2E, a majority of the sinus cavity has been determined to be opacified while a clear section has been determined to exist within a portion of the sinus cavity. Using the output of the CNN illustrated in FIG. 2E, a three-dimensional model of the sinus cavity may be generated as illustrated in FIG. 2F and may visually indicate portions of the sinus cavity which are clear and/or opacified.

Technical validation of the results of the trained CNN may in some embodiments comprise comparing manually created sinus segmentations with sinus segmentations automatically created by the CNN, for example, by using Dice coefficient. Validation of results of a CNN having processed the CT scans of the testing cohort described above in relation to Table 1 showed excellent accuracy, with a mean Dice coefficient of 0.93 and a range of 0.86 to 0.97. Distances between manual and automatic segmentation surfaces also showed excellent accuracy, with a mean distance between surfaces of 0.30 mm and a range of 0.1 to 1.1 mm. Bland-Altman analysis in the testing cohort showed good agreement, with a mean difference in opacification calculated from manual and automatic segmentations of 1.0%. Limits of agreement were −1.4% with a 95% confidence interval (CI), −2.0 to −0.7, and 3.4% with a 95% CI, 2.7-4.1.

The average CNN opacification score of the CT scans within the test cohort was 26.6% with a standard deviation (SD) of 21.7% and an overall range of 7.1% to 100.0%. Patients with established CRS diagnoses had significantly greater opacification than those who did not (32.7% vs 18.4%; difference in means: 14.3% (95% CI, 11.1-17.7); $p<0.0001$), as did participants with a diagnosis of asthma (32.9% vs 21.4%; difference in means: 11.4% (95% CI, 7.6-15.2); $p<0.0001$). Patients with a history of sinus surgery were also identified by the CNN as having significantly greater opacification (33.9% vs 22.6%; difference in means: 11.2% (95% CI, 7.1-15.4); $p<0.0001$) and LM scores (5.6 vs 3.1; difference in means: 2.5 (95% CI, 1.5 to 3.4); $p<0.0001$) than those who did not have a history of sinus surgery. Multiple linear regression controlling for age, sex, and smoking status showed that an asthma diagnosis and a CRS diagnosis were each independently associated with greater CNN opacification ($p<0.0001$, $R^2=0.20$). In a similar model, asthma, and CRS diagnoses were also independently associated with greater average total LM score ($p<0.0001$, $R^2=0.20$). Patients with both CRS and asthma diagnoses tended to have greater opacification by either the CNN method or visual scoring.

The CNN trained as described herein may be configured to determine a volume of a sinus cavity using an input CT scan. As found with the testing cohort described above, the average volume of the sinus cavities based on automatic segmentation was 62.8 $cm^3$. Those patients with a diagnosis of CRS were found to have a significantly smaller sinus volume than those without (61.3 $cm^3$ vs 64.9 $cm^3$, a difference in means of 3.7 $cm^3$ (95% CI, 0.3-7.0); $p=0.031$). The relationship of CRS and sinus cavity volume remained true in multiple linear regression controlling for age, sex, history of sinus surgery, and asthma diagnosis. The ability to, with a CNN trained as described herein, calculate sinus volume automatically may be useful in future research in strict CRS populations, regardless of surgical history.

Visual Assessment

Intraclass correlation coefficients (ICCs) comparing the total LM scores assigned by analysts to the testing cohort of CT scans were high (rho=0.91,$p<0.0001$). The absolute difference in total LM scores between the analysts for the CT scans of the testing cohort was less than or equal to one point in 178 cases, and these CT scans were scored independently by a radiologist. ICCs between the total scores assigned by the radiologist and each analyst were also high (for example, 0.93 and 0.85; p<0.0001 for two analysts). The average LM score in the test cohort was 4.0 (SD, 5.1). The CT scans for patients with a diagnosis of CRS had on average a significantly greater total LM score than patient who were not diagnosed with CRS (5.4 vs 2.1; difference in means: 3.3 (95% CI, 2.5 to 4.1); p<0.0001). The correlation between the average total LM score and the average opacification score generated by the CNN was high (rho=0.82 (95% CI, 0.79-0.85); p<0.0001).

TABLE 2

CNN Opacification Score by Average Total LM Score

| Average total LM score | n | CNN Opacification (%) | |
|---|---|---|---|
| | | Mean | 95% CI |
| LM = 0 | 138 | 12.7 | 12.1-13.3 |
| 0 < LM <= 4 | 231 | 16.1 | 15.3-16.9 |
| 4 < LM <= 8 | 52 | 35.9 | 32.7-39.1 |
| 8 < LM <= 12 | 42 | 51.1 | 46.9-55.3 |
| 12 < LM <= 16 | 22 | 64.5 | 58.1-70.9 |
| 16 < LM <= 20 | 16 | 85.2 | 80.3-90.0 |
| LM > 20 | 9 | 94.3 | 88.8-99.7 |

Figure 3A:
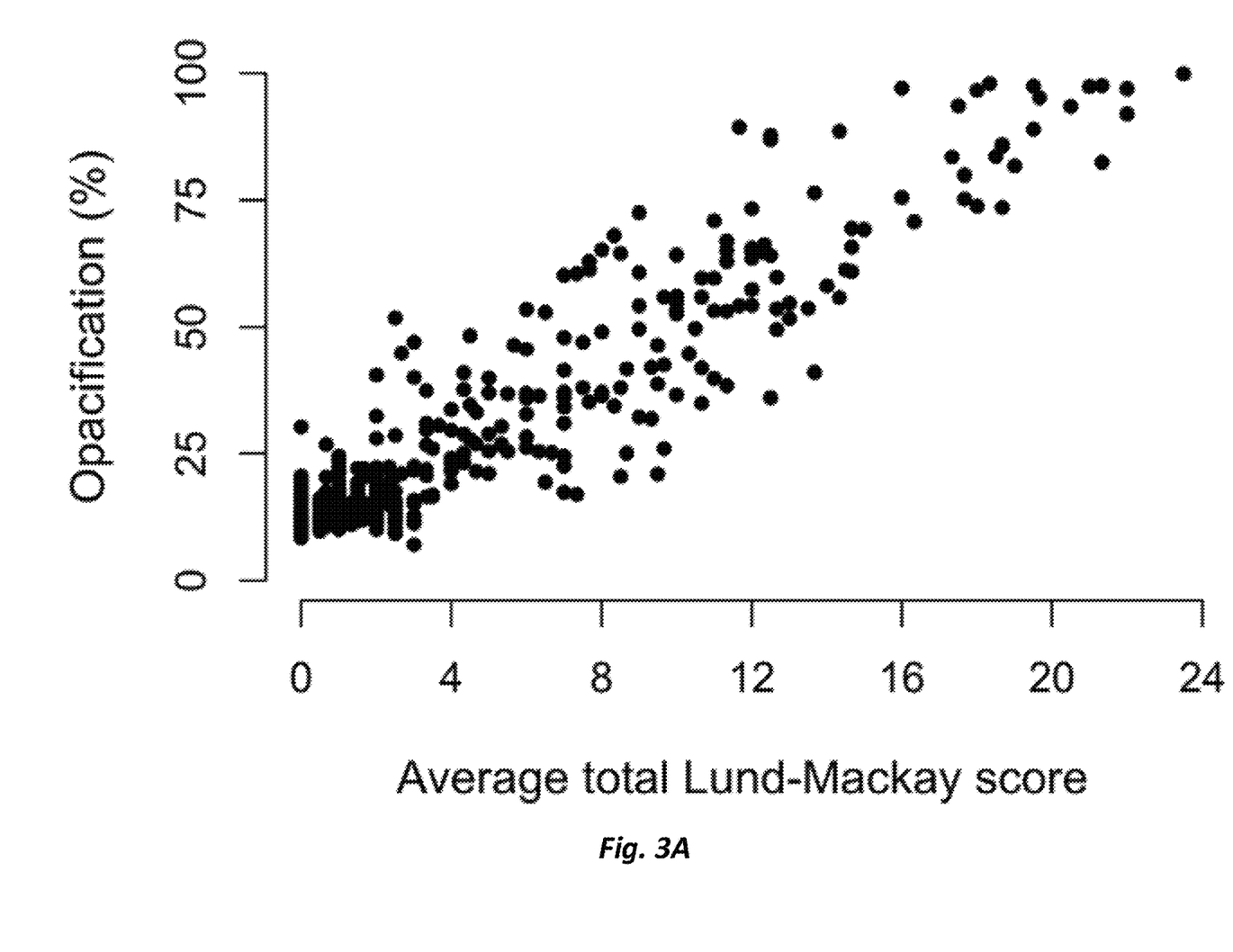
FIGS. 3A and 3B are graphs illustrating benefits of AI sinus opacification assessment systems in accordance with one or more of the embodiments described herein.
Figure 3B:
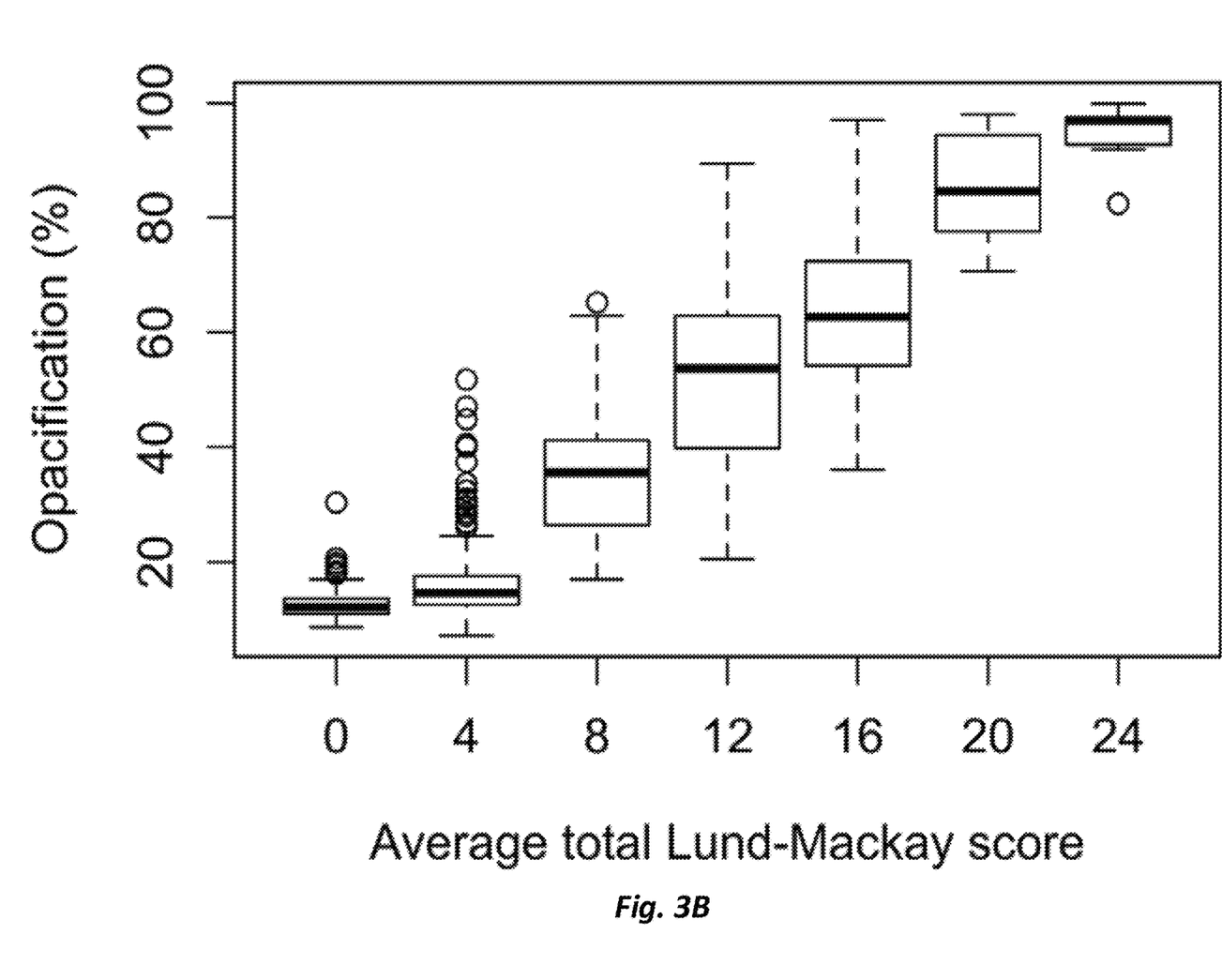

Table 2 illustrates the mean opacification score as determined by a trained CNN and stratified into bins by average total LM score. Tukey's multiple comparison of means illustrates the mean CNN opacification score is significantly different between any two bins of average total LM (p<0.01 with Bonferroni adjustment), except when comparing the two most severe bins (p=0.39). FIG. 3A shows a scatterplot comparing CNN opacification percentage determinations on the vertical axis and average total LM scores on the horizontal axis for a set of CT scans scored both manually and automatically. FIG. 3B shows a boxplot of opacification scores by subgroups defined by average total LM score. The average automatic opacification score of 12.7% for patients with an LM score of zero likely results from CNN segmentations, including normal mucosa and CT volume averaging of thin bony trabeculae in the ethmoid sinuses. Such segmentations tend to have CT attenuation values between −500 and +200 HU and thus may contribute to the overall CNN opacification score.

Association Between Clinical Parameters and CT-Derived Metrics

In general, significant moderate-to-weak univariate correlations are seen between CT-derived measures and clinical variables as can be appreciated from Table 3, below. The strength of associations is similar for automatic opacification or average total LM scores. Table 3 illustrates Spearman correlations between CT assessments and clinical variables for a testing cohort of CT scans.

TABLE 3

Spearman correlations between CT assessments and clinical variables for a testing cohort grouped by diagnosis of CRS

| | Average total LM score | | | CNN opacification score | | |
|---|---|---|---|---|---|---|
| | rho | 95% CI | p value | rho | 95% CI | p value |
| Average total LM score | — | — | — | 0.82 | | <0.001 |
| FEV$_1$ percent predicted | −0.19 | −0.10 to −0.27 | <0.001 | −0.21 | −0.12 to −0.29 | <0.001 |
| FEV$_1$/FVC percent | −0.26 | −0.17 to −0.34 | <0.001 | −0.27 | −0.19 to −0.35 | <0.001 |
| Exhaled nitric oxide | 0.41 | 0.34 to 0.48 | <0.001 | 0.40 | 0.33 to 0.47 | <0.001 |
| Immunoglobulin E (kU/L) | 0.21 | 0.13 to 0.29 | <0.001 | 0.20 | 0.12 to 0.28 | <0.001 |
| Absolute eosinophil count (k/μL) | 0.33 | 0.25 to 0.41 | <0.001 | 0.28 | 0.19 to 0.36 | <0.001 |
| Sinus cavity volume (cm$^3$) | −0.41 | −0.05 to −0.22 | 0.001 | −0.32 | −0.24 to 0.39 | <0.001 |

Table 4, below, illustrates results of multiple linear regression. Both LM scores and CNN opacification scores were associated with pulmonary function, FeNO, and absolute eosinophil count, independent of CRS or asthma diagnosis. The degree of association between clinical variables and CNN opacification or average LM total was similar. The data included in Table 4 illustrates the relationships between automatic opacification scores (on a range of 0-100%) and average total LM scores (on a range of 0-24 points) for CT scans in a test cohort of 510 patients (n=510), controlling for age, sex, smoking status, chronic rhinosinusitis diagnosis, and asthma diagnosis, and for dependent variables.

TABLE 4

Multiple Linear Regression Analysis

| | CNN opacification (0-100%) | | | Average total LM score (0-24) | | |
|---|---|---|---|---|---|---|
| | Estimate | p value | R2 | Estimate | p value | R2 |
| FEV$_1$ percent predicted | −0.19 | <0.001 | 0.10 | −0.60 | 0.005 | 0.09 |
| FEV$_1$/FVC | −0.16 | <0.001 | 0.11 | −0.60 | <0.001 | 0.11 |
| Exhaled nitric oxide | 0.73 | <0.001 | 0.24 | 2.93 | <0.001 | 0.24 |

TABLE 4-continued

Multiple Linear Regression Analysis

| | CNN opacification (0-100%) | | | Average total LM score (0-24) | | |
|---|---|---|---|---|---|---|
| | Estimate | p value | R2 | Estimate | p value | R2 |
| Immunoglobulin E (kU/L) | 0.81 | 0.12 | 0.09 | 3.67 | 0.08 | 0.09 |
| Eosinophil absolute (k/μL) | 0.01 | <0.001 | 0.09 | 0.05 | <0.001 | 0.10 |

As disclosed herein, a CNN may be trained for fully automatic, objective assessment of paranasal sinus opacification on CT scans in a large, real-world population of patients with varying degrees of sinonasal inflammation. Using the systems and methods described herein, a CNN can automatically segment paranasal sinuses to produce volumetric opacification scores that are concordant with LM visual scoring as well as opacification based on manual image segmentation. CRS frequently accompanies lower airway disease and its recognition and management is of particular importance in severe or refractory pulmonary diseases such as asthma and cystic fibrosis. Opacification scores generated with a CNN trained as described herein are associated with CRS and asthma diagnoses as well as lung function and blood biomarkers, further validating the potential utility of the disclosed systems and methods in a clinical setting.

In considering differences between different types of CT equipment and imaging protocols, it can be expected that CNNs may require training data from a variety of CT equipment types and using a variety of imaging protocols to accommodate CT scans from a range of sources. It should be appreciated, based on the systems and methods described herein, individual sinus cavities can be analyzed separately so that opacification can be calculated on a per-sinus basis. Furthermore, automatic segmentation and deep learning can facilitate analysis beyond opacification, such as characterization of fluid levels, neoosteogenesis, and/or other features of interest captured by CT.

Figure 4:
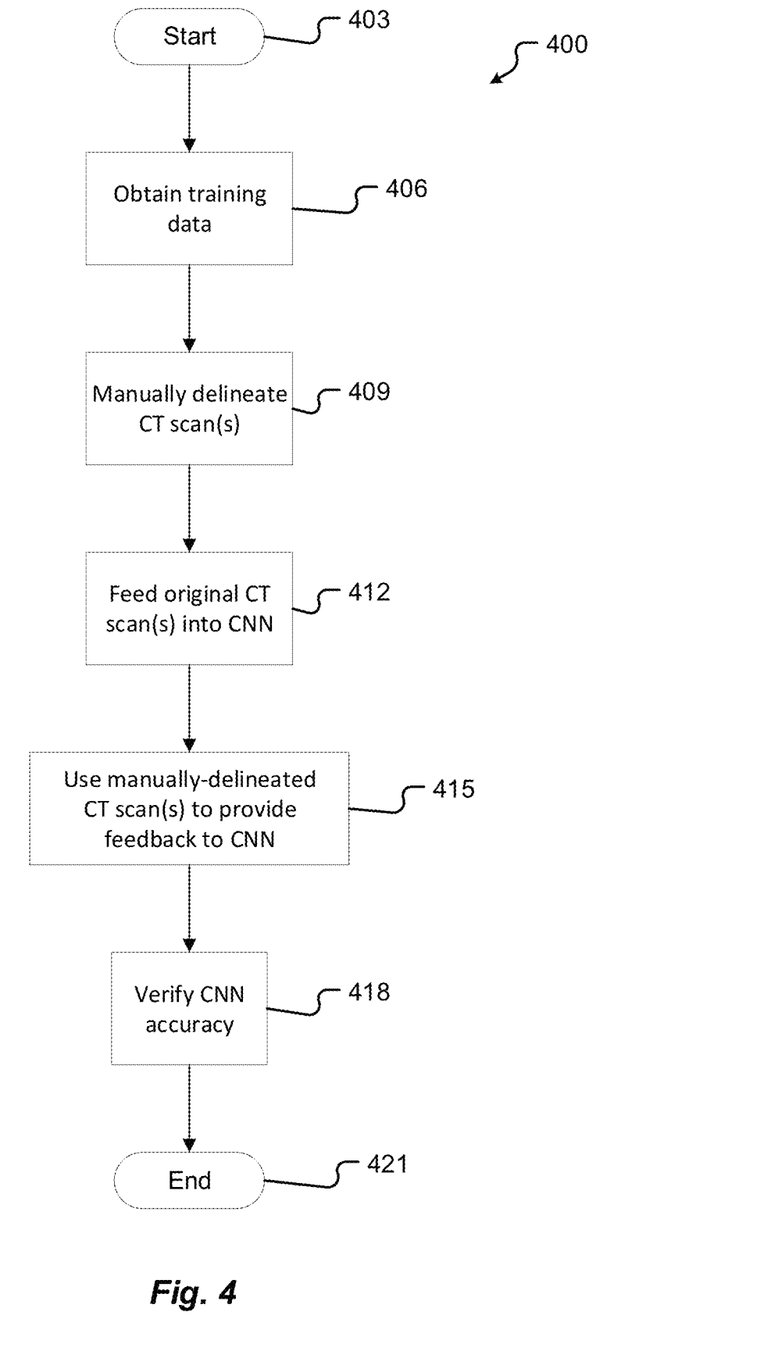
FIGS. 4 and 5 are flowcharts of methods in accordance with one or more of the embodiments described herein.

In accordance with the systems and methods described herein, an exemplary embodiment of a method 400 for training a CNN is illustrated by the flowchart of FIG. 4. As illustrated in FIG. 4, a method 400 for training a CNN may begin at step 403 in which a computer system executing a CNN is accessed by a user. While the method 400 of FIG. 4 is described in relation to the assessment of the opacification of sinus cavities, it should be appreciated the same or a similar method may be used to assess factors other than opacification in sinus cavities or in any type of skeletal structure, such as cavities in any bone, whole bones, joint spaces, etc.

At step 406, the user may obtain training data. Training data, as described herein, may comprise a set of CT scans. Each CT scan may be a coronal CT scan associated with a patient. Each CT scan may also be associated with a set of data relating to the patent with which the CT scan is associated. For example, each CT scan may be associated with data such as age of patient, sex of patient, indicators of whether the patient has a history of sinus issues or diagnoses of asthma or CRS, etc.

For each CT scan in the set of CT scans being used as training data, the user or a group of users such as trained analysts may manually delineate the sinus cavity. In some embodiments, delineating the sinus cavity for each CT scan may comprise marking each portion of the CT scan which is determined by the user or users to be within a sinus cavity.

In some embodiments, the user or users may delineate each zone of each sinus cavity separately, for example, users may identify portions of each CT scan which are within each of the left and right maxillary sinuses, left and right frontal sinuses, left and right sphenoid sinuses, left and right anterior ethmoid sinuses, left and right posterior ethmoid sinuses, left and right zones of the ostiomeatal complex ("OMC").

In some embodiments, multiple users may independently delineate each CT scan and the delineations created by each user for a particular CT scan may be compared. If any differences exist, an average of the delineations may be created for use in the method 400.

At step 412, each original, unedited, CT scan may be fed into the CNN as an input. It should be appreciated that in some embodiments CT scan may be edited in some way, such as being cropped or aspects such as brightness and contrast may be adjusted.

In step 415, the CNN may produce an output based on the input CT scan. In some embodiments, the output of the CNN may be an image file containing the CT scan image along with annotation details indicating which portions of the CT scan relate to one or more sinus cavities. The manually-delineated CT scans from step 409 may be used to train the CNN to accurately determine which portion of the input CT scans relate to a sinus cavity.

At step 418, the accuracy of the CNN may be verified. The training method 400 illustrated in FIG. 4 may continue until the CNN is appropriately accurate.

As step 421, the method 400 may end with a CNN trained to accurately determine portions of an unknown CT scan which are within a sinus cavity.

Figure 5:
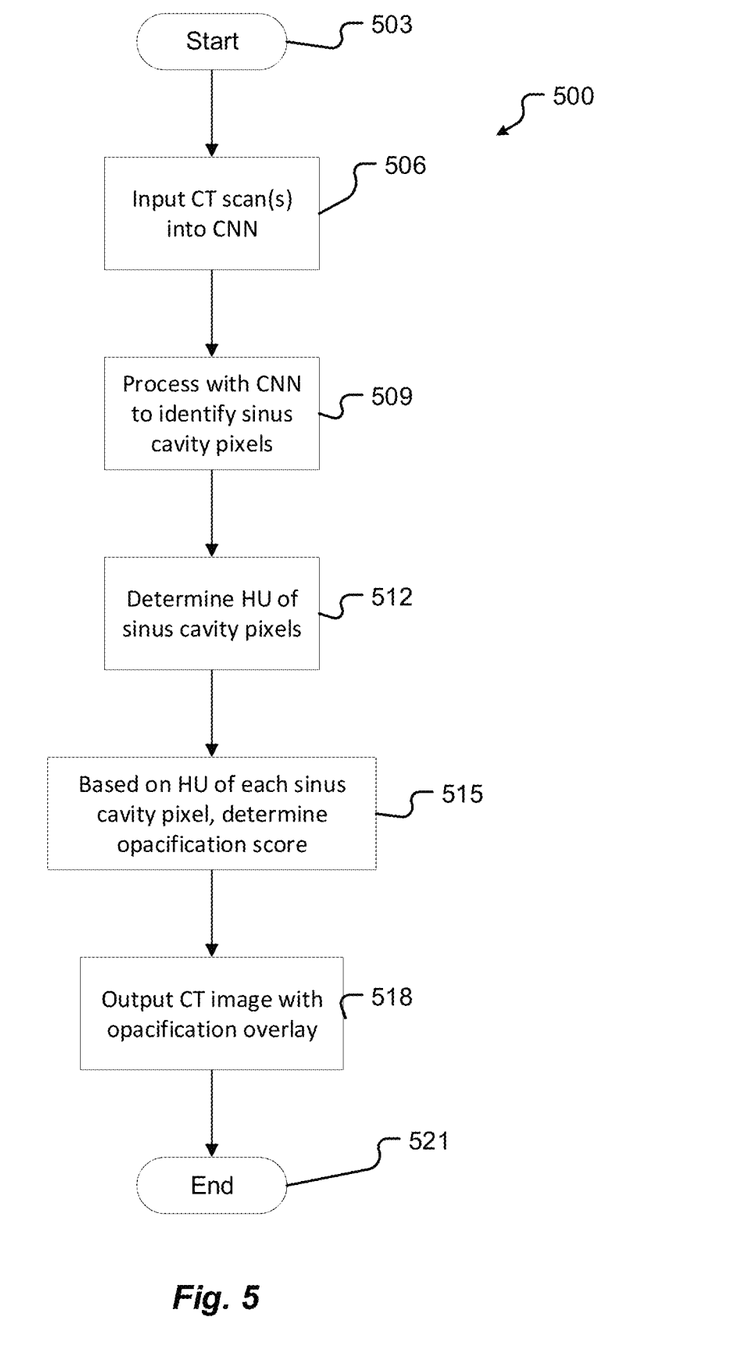

As illustrated in FIG. 5, a method 500 of using a CNN to automatically determine an opacification of a CT scan may be performed using a computer system. The method 500 may start at step 503 in which a computer system executing a CNN trained to delineate sinus cavities in CT scans and to determine opacification scores for CT scans may be accessed by a user such as a trained analyst.

At step 506, a first CT scan may be input into the trained CNN. In some embodiments, multiple CT scans may be simultaneously input into the CNN. Inputting a CT scan may comprise uploading an image file to the computer system or may comprise using a CT scan machine to generate a CT scan of a patient.

At step 509, the CNN may process the input CT scan or scans to delineate sinus cavities. For example, the CNN may identify which pixels of the CT scan image represent a portion of a sinus cavity. In some embodiments, a CT scan image may be visually marked by the CNN to identify the sinus cavity pixels. In some embodiments, a list of pixels corresponding to sinus cavity may be created.

At step 512, for each pixel representing a portion of a sinus cavity, an HU intensity value may be measured. As discussed above, the CNN may be trained to generate an estimate of a total sinus opacification. Sinus opacification may be measured by the CNN by detecting an intensity value in HU for each pixel within an input CT scan. The nominal pixel intensity value for air in a CT scan is around −1000 HU, the nominal pixel intensity value for water in a CT scan is around 0 HU, and the nominal pixel intensity value for bone in a CT scan is around 200 HU. A cut-off value of −500 HU can be used to separate air from soft tissue while excluding bone. As such, pixels with an intensity value of between −500 and +200 HU may be determined by the CNN to be effectively opacified.

In some embodiments, opacification may be calculated as a percentage of a sinus cavity volume with CT pixels having an intensity greater than −500 HU. Such a percentage may be an accurate estimate of opacification as pixel intensity in a CT scan is proportional to physical density and expressed on the HU scale, where −1000 HU is the nominal value for air and 0 HU is the nominal value for water.

At step 515, based on the HU of each sinus cavity pixel, an overall opacification score for the input CT scan may be generated or determined. The opacification score for the input CT scan may be a number or set of numbers and may be stored in memory such as in metadata for the input CT scan.

At step 518, an opacification overlay image may be automatically generated by the CNN or other process executing on the computer system. The opacification overlay may be a visual representation of the opacification of the sinus cavity within the input CT scan as illustrated by FIGS. 2B and 2E. In some embodiments, a three-dimensional representation of the opacification may be created as illustrated in FIGS. 2C and 2F.

At step 521, after the output of the opacification overlay and/or opacification score by the CNN, the method 500 of FIG. 5 may end. The method 500 may be repeated as necessary for any input CT scans.

Figure 6:
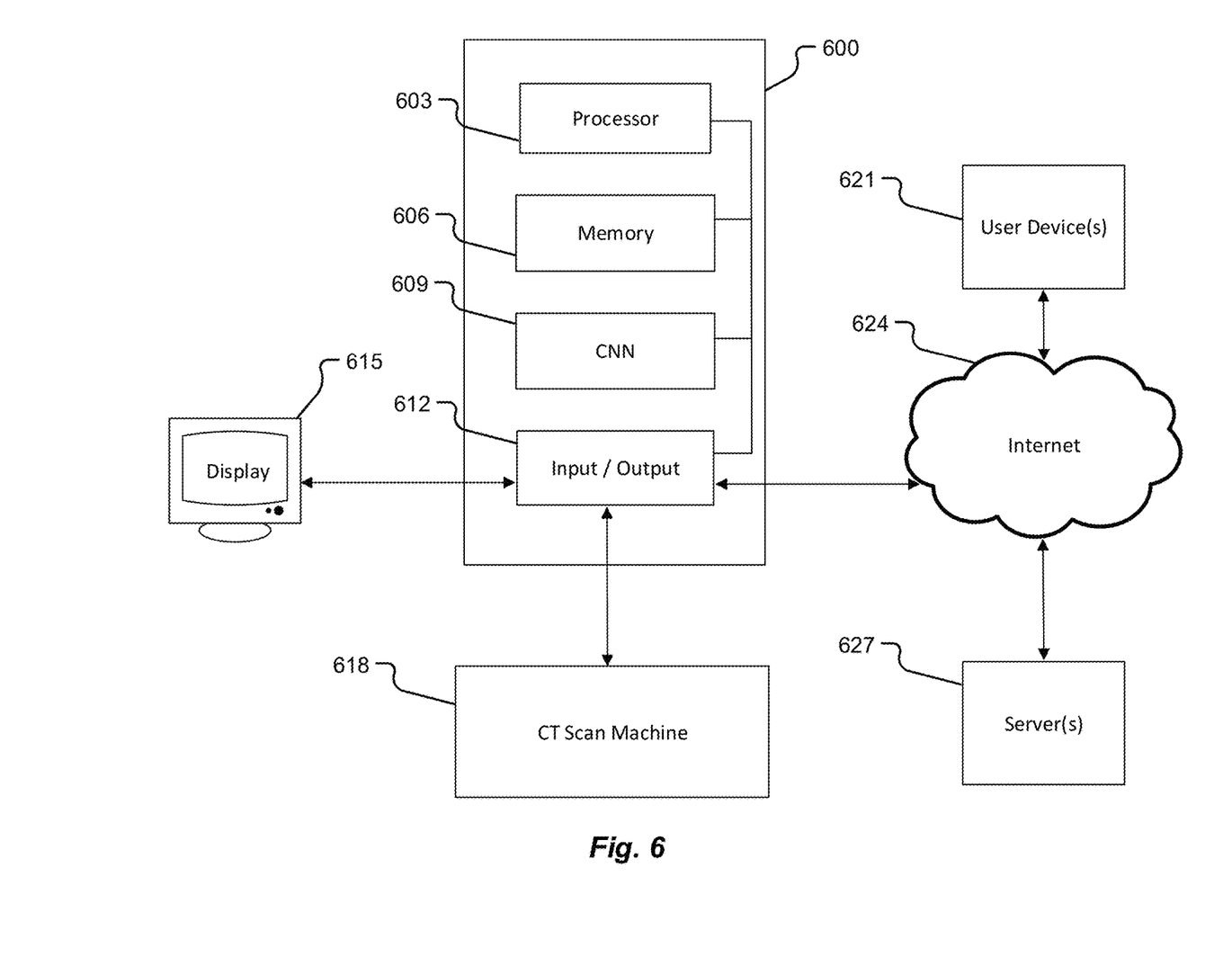
FIG. 6 is a block diagram of a computing environment in accordance with one or more of the embodiments described herein.

As illustrated in FIG. 6, a computer system 600 may be configured to execute one or more of the processes and methods described herein. In accordance with one or more embodiments as described herein, a computer system 600 may comprise a processor 603 configured to execute processes. The computer system 600 may be configured to execute a convolutional neural network 609. The CNN 609 maybe a process executed by the processor 603 and maybe an application stored in memory 606 of the computer system 600. The computer system 600 may comprise and input output subsystem 612. The input output subsystem 612 may be configured to communicate with a display device 615.

For example, the computer system 600 may be configured to display a graphical user interface on the display device 615. A graphical user interface may be used by a user of the computer system 600 to control processes executed by the computer system 600 such as a convolutional neural network program. The display device 615 may be capable of displaying images associated with CT scans such as those illustrated in FIGS. 2A-2F.

The input output subsystem 612 may also be configured to communicate with one or more CT scan machines 618. A CT scan machine 618 may be operable to generate a CT scan from a patient. CT scans generated by the CT scan machine 618 may be sent to the computer system 600 via the input output subsystem 612. CT scans generated by the CT scan machine 618 may be used by the computer system 600 as inputs to the CNN 609. Note that it should be appreciated that, while the methods and systems described herein relate to CT scans, such methods and systems may be executed using any type of visual image of a sinus cavity, such as x-ray, MRI, etc.

The computer system 600 may be configured to communicate with one or more external devices using the input output subsystem 612. For example, the input output subsystem 612 may be configured to communicate via an Internet connection 624. Through the Internet connection 624, the computer system 600 may be operable to communicate with one or more user devices 621 and or servers 627. User devices 621 maybe capable of interacting with the computer system 600. For example, users may be capable of accessing the CNN 609 remotely. A server 627 may be used to store one or more input CT scan images and or output CT scan images or three-dimensional representations of opacification generated by the CNN 609.

While the systems and methods described herein relate to the estimation of the volume, density, and opacification of a CT scan, it should be appreciated the same or similar systems and methods may be used to estimate volume, density, and opacification of other areas of a body. Opacification, as described herein, may be considered a radiomic feature. As described herein, an automatic analysis pipeline for sinus CT scan analysis may be implemented.

Using the systems and methods of automatic delineation of anatomic boundaries on CT scans as described herein, a variety of morphologic characteristics such as volume, density, opacification as well as more abstract characteristics may be calculated. Furthermore, the systems and methods of delineating and estimating the volume of a sinus cavity may be used to delineate the boundaries and estimate the volume of a tumor or to study features relating to bone rind. Such a system or method can be implemented or performed for areas throughout the body.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of detecting a presence of opacification in a skeletal structure of a patient, the method comprising:
   receiving, with a processor of a computing system, a first image, wherein the first image is a computed tomography (CT) image on sinuses processing, with the processor, the first image using a convolutional neural network (CNN) to yield a second image comprising one or more sinus cavities identified by the CNN; and generating, with the processor, an opacification score for the second image by determining a percentage of pixels within the one or more sinus cavities of the second image that have an intensity value between −500 and +200 Hounsfield units.

2. The method of claim 1, wherein processing the first image comprises using the CNN to delineate the skeletal structure.

3. The method of claim 1, wherein the pixels within the second image are CT pixels.

4. The method of claim 1, further comprising:
rendering the second image to a display device, wherein the second image comprises visual markings that show opacified regions and clear regions of the one or more sinus cavities.

5. The method of claim 4, further comprising:
rendering a third image to the display device, wherein the third image comprises a three-dimensional model that includes the one or more sinus cavities and the visual markings.

6. The method of claim 5, wherein the three-dimensional model that includes the one or more sinus cavities and the visual markings excludes regions of the skeletal structure that surround the one or more sinus cavities.

7. The method of claim 1, further comprising computing and outputting a total volume of the skeletal structure.

8. The method of claim 1, wherein the skeletal structure is a skull.

9. The method of claim 4, wherein the opacified regions and the clear regions are displayed with different colors.

10. The method of claim 1, further comprising determining contents of the skeletal structure based on the opacification score.

11. A system for detecting a presence of opacification in a skeletal structure of a patient, the system comprising:
a processor; and
a computer-readable storage medium storing computer-readable instructions which, when executed by the processor, cause the processor to:
receive a first image, wherein the first image is a computed tomography (CT) image on sinuses
process the first image using a convolutional neural network (CNN) to yield a second image comprising one or more sinus cavities identified by the CNN; and
generate an opacification score for the second image by determining a percentage of pixels within the one or more sinus cavities of the second image that have an intensity value between −500 and +200 Hounsfield units.

12. The system of claim 11, wherein processing the first image comprises using the CNN to delineate pixels of the skeletal structure.

13. The system of claim 11, wherein the pixels within the second image are CT pixels.

14. The system of claim 11, wherein the computer-readable instructions comprise instructions, which when executed by the processor, cause the processor to render the second image to a display device, wherein the second image comprises visual markings that show opacified regions and clear regions of the one or more sinus cavities.

15. The system of claim 14, wherein the computer-readable instructions comprise instructions, which when executed by the processor, cause the processor render a third image to the display device, wherein the third image comprises a three-dimensional model that includes the one or more sinus cavities and the visual markings.

16. The system of claim 15, wherein the three-dimensional model that includes the one or more sinus cavities and the visual markings excludes regions of the skeletal structure that surround the one or more sinus cavities.

17. The system of claim 11, wherein the computer-readable instructions comprise instructions, which when executed by the processor, cause the processor to compute and output a total volume of the skeletal structure.

18. A computer program product for detecting a presence of opacification in a skeletal structure of a patient, the computer program product comprising a non-transitory computer-readable storage medium having computer-readable program code embodied therewith, the computer-readable program code configured, when executed by a processor, to cause the processor to:
receive a first image, wherein the first image is a computed tomography (CT) image on sinuses
process the first image using a convolutional neural network (CNN) to yield a second image comprising one or more sinus cavities identified by the CNN; and
generate an opacification score for the second image by determining a percentage of pixels within the one or more sinus cavities of the second image that have an intensity value between −500 and +200 Hounsfield units.

* * * * *